F. Burrows,
Photographic Printing Frame,
Nº 43,831. Patented Aug. 16, 1864.
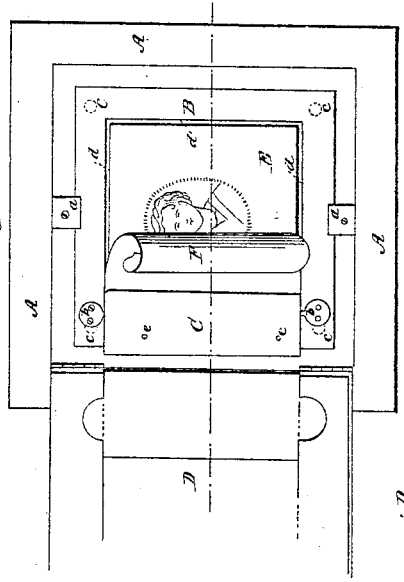
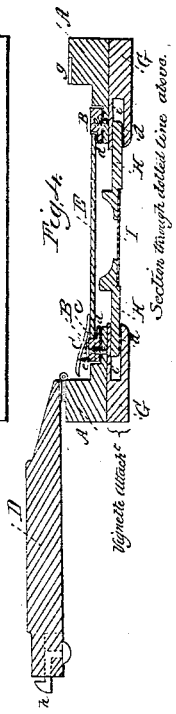
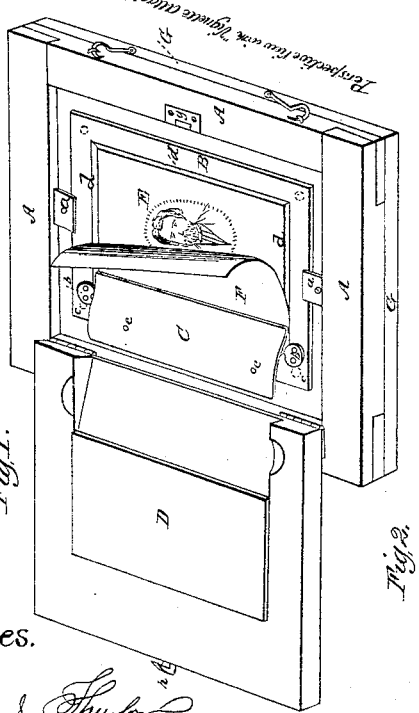
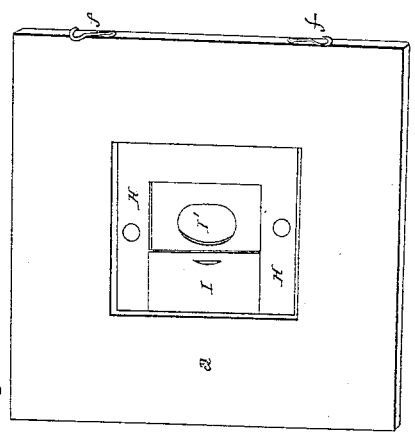
Witnesses.
Inventor.
Francis Burrows

UNITED STATES PATENT OFFICE.

FRANCIS BURROWS, OF PEORIA, ILLINOIS.

PHOTOGRAPHIC-PRINTING FRAME.

Specification forming part of Letters Patent No. 43,831, dated August 16, 1864.

*To all whom it may concern:*

Be it known that I, FRANCIS BURROWS, of the city and county of Peoria, and State of Illinois, have invented a new and useful Improvement in Photographic-Printing Frames, and also in Vignette-Printing Frames; and I do hereby declare that the following is a full, clear, and exact description of the construction and operation of the same, reference being had to the annexed drawings, making a part of this specification, in which—

Figure 1 is a perspective view of my full-view photographic-printing frame. Fig. 2 is the vignette attachment to the same. Fig. 2, B is a transverse section of the same. Fig. 3, a plan of the photographic-printing frame, and Fig. 4 a transverse section of the same.

Fig. 1 is the complete apparatus with the shutter D opened, disclosing the principal arrangement.

A is the frame into which the padded shutter D closes flush with the frame, which frame may be made of any size that convenience may require, preserving the relative proportions of the drawings.

B is the diaphragm holding the "negative" E. The diaphragm is secured within the frame A by the clasps $a$ $a$, which are screwed to the frame and sunk into the diaphragm from one-eighth to one-fourth of an inch, allowing room for the diaphragm to rise and fall with pressure of the padded shutter D. Under each corner is a spiral or elliptic spring, $c$ $c$ $c$ $c$, for the purpose of pressing the diaphragm and negative within it against the padded shutter D and the silvered paper F. The recess within the diaphragm on which the negative rests is lined with rubber, cloth, or other elastic material at $d$ $d$ $d$, to secure an equal pressure on the glass or negative. The depth of this recess should be equal to the thickness of the negative, so that its surface comes flush with the plane of the diaphragm. The diaphragm rests on the springs $c$ $c$ $c$ $c$, before mentioned, which elevates the same from one-eighth to one-fourth inch above the level of the recess in the frame A, in which it (the diaphragm) lies, thus securing pressure against the shutter D.

C is a clasp, which holds both the negative and the silvered paper in contact while printing. The paper is inserted and removed at pleasure by pressing the outer edge of the clasp downward against another set of spiral or other springs, $e$ $e$, placed between the under side of clasp and the diaphragm. (See section at Fig. 4.) These springs slide on posts or guides let into the clasp. The clasp moves on spindles at each end, $b$ $b$, screwed to the diaphragm.

D is a shutter padded with cotton or rubber or other elastic material, raised in the center to fit into recess of frame A against the diaphragm, and hung on hinges, and shutting down flush with the frame A, and fastening with the sliding spring $h$ or snap at $g$.

Fig. 2 is the vignette attachment, which is fastened to the frame A, Fig. 1, by hooks $ff$, (as represented in Fig. 1 at G,) or similar fastenings.

H H is a movable panel, sliding freely within the interior of the frame in the recess, (marked $i$ $i$ in the transverse section B, Fig. 2,) provided with an aperture, I′, of size of portrait, with a beveled edge (blackened) widening or opening three-fourths inch inward toward the negative, to which it approaches within one-sixteenth of an inch, when the shutter D is closed on the diaphragm, and varying to one-fourth inch when the shutter opens. The outer edge of the beveled opening falls back at a right angle to the panel H H, for the purpose of giving play to the panel and adjusting the aperture to the portrait or negative. A ground-glass slide, I, moving in a groove, fits over the aperture at pleasure to soften sunshine. The panel may be fitted with rubber, $d$, at the corners, to prevent sliding after adjustment, and may be inclosed within its recess by a metallic plate, as in section B, Fig. 2, with screws.

Operation: To print by my apparatus, (see Fig. 1,) open the shutter D by placing the thumb on the sliding snap, when the shutter will, by the action of the diaphragm-springs, be forced up one-fourth inch above surface of frame A. Throw the shutter open and place the thumb on the "clasp" C, and drop the negative required to print from into its recess in the diaphragm B. Then insert between the negative and the clasp the silvered paper F, and drop the clasp, which holds securely the negative in its recess and the paper at its edge next to the hinges of the shutter. Close the shutter (which will, by its pad and the action of the spring diaphragm against the shutter, press the paper to the negative) and shut with sliding snap.

It is now ready for printing. The whole face of print may, by this arrangement, be examined at any stage of the printing by simply opening the shutter and raising the edge of the print, which can be turned back as far as the clasp without any disarrangement. The removal and substitution of another paper are momentary operations, and can be done without the slightest danger to the negative.

To print a vignette, hook the vignette attachment to the back of frame A, Fig. 1, with the beveled edge of opening toward negative, of course placing the opening toward the sun when ready for printing. In case of sunshine, close the opening with the ground glass slide I.

The advantages of my apparatus consist as follows: Of an instantaneous adjustment of the negative and paper for printing, and of the examination of the whole print in any stage of printing without displacing or danger of injury or breakage to the negative, to which the old plan is liable. It also supersedes the trouble of replacing and adjusting the paper padding, at present used, every time the print was examined or removed; also the troublesome and insecure modes of fastening the paper to the negative with clamps at each corner or springs at the top of the shutter each time of changing a print.

The advantages of the vignette attachment are, a quicker and surer adjustment of the vignette "opening" to the negative, and a perfect exclusion of all light (a very uncertain operation by the old style of paper diaphragms in tin vignettes,) making a perfect vignette with expedition and certainty, with softer or harder shades, as required, by means of beveled opening, much finer than could be obtained by former modes.

What I claim as my improvement, and desire to secure by Letters Patent, is—

1. A spring-diaphragm moving in a recess which is lined with elastic material for the reception of the negative, substantially as described.

2. An attached hinged shutter, with stationary padding closing on the spring-diaphragm, secured by a latch or spring snap, or its equivalent.

3. A removable vignette-panel, with beveled opening widening toward the negative and excluding all extraneous light, in the manner described.

FRANCIS BURROWS.

Witnesses:
E. G. JOHNSON,
BERNARD BAILY.